June 29, 1948. E. J. PANISH 2,444,364
CLUTCH AND POWER SUPPLY CONTROL SYSTEM
Filed June 26, 1941 6 Sheets-Sheet 1
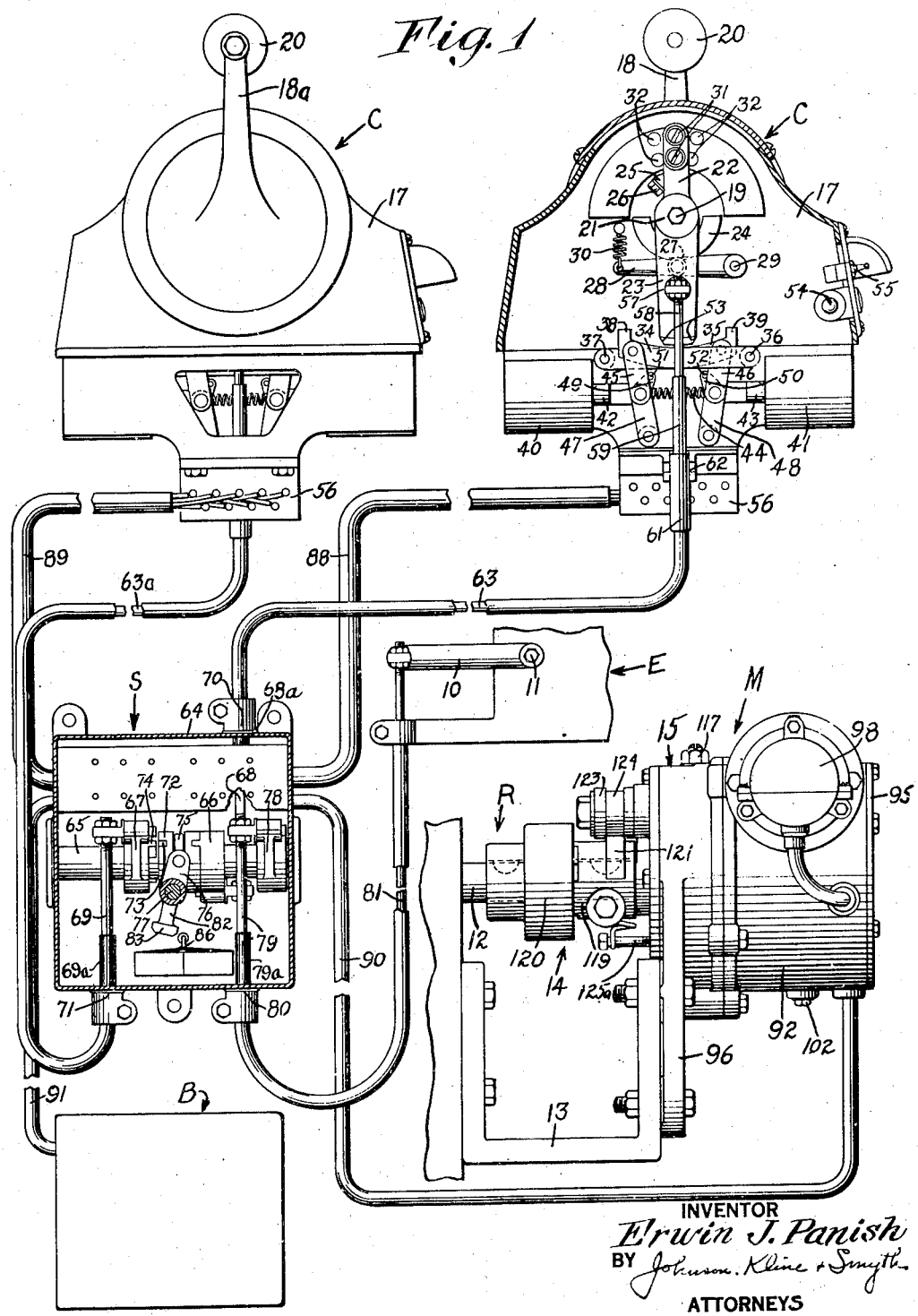
INVENTOR
Erwin J. Panish
BY Johnson, Kline & Smyth
ATTORNEYS

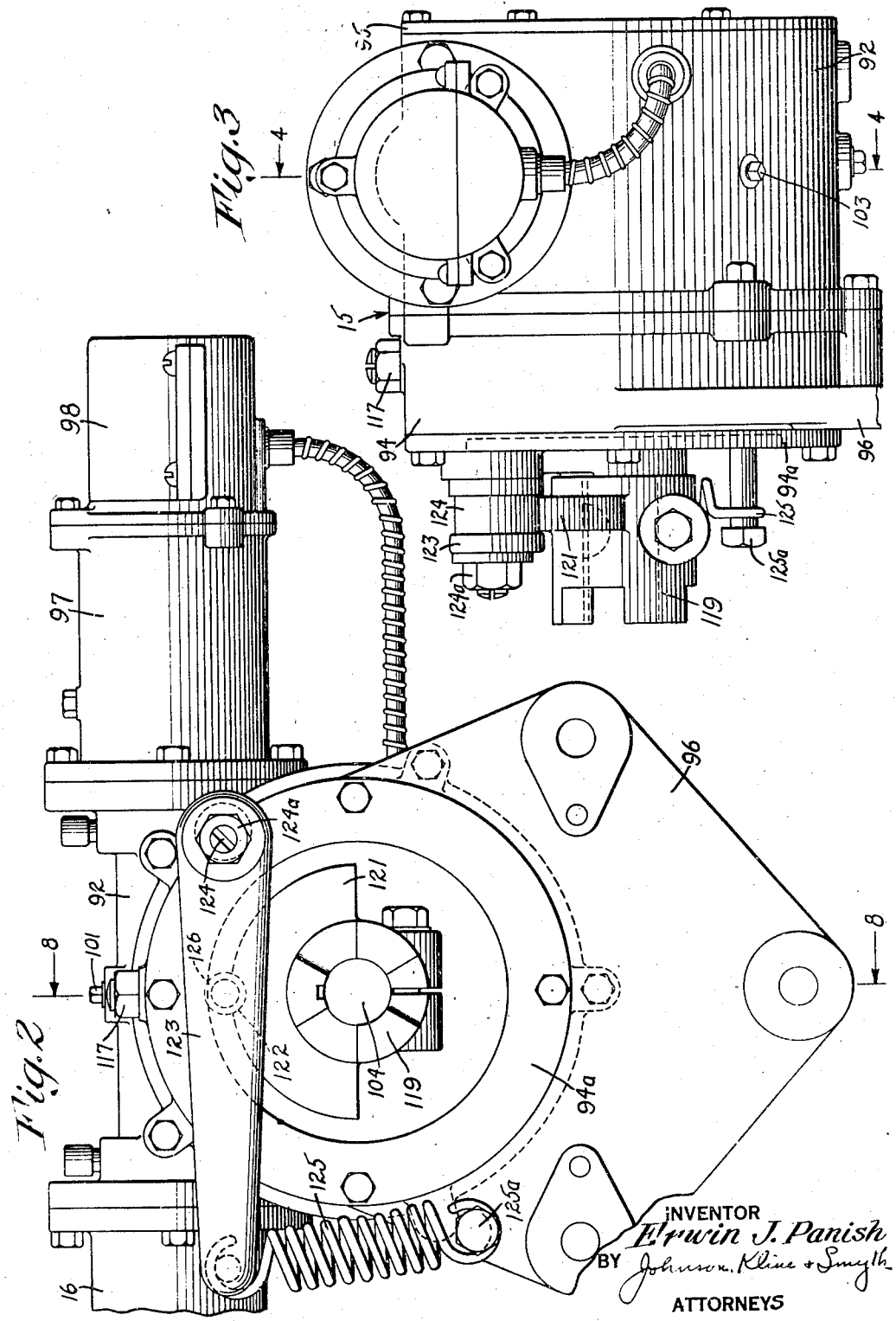

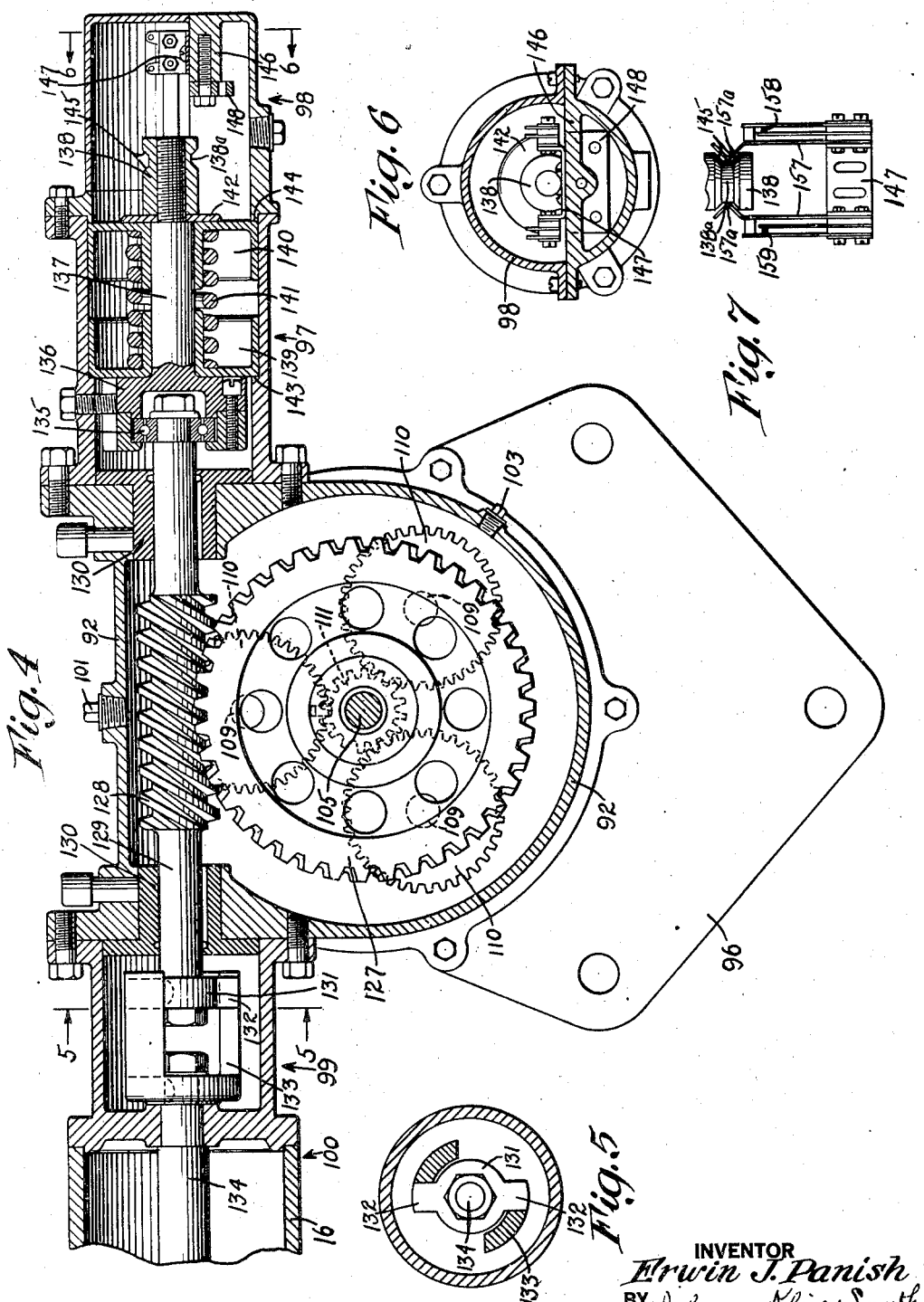

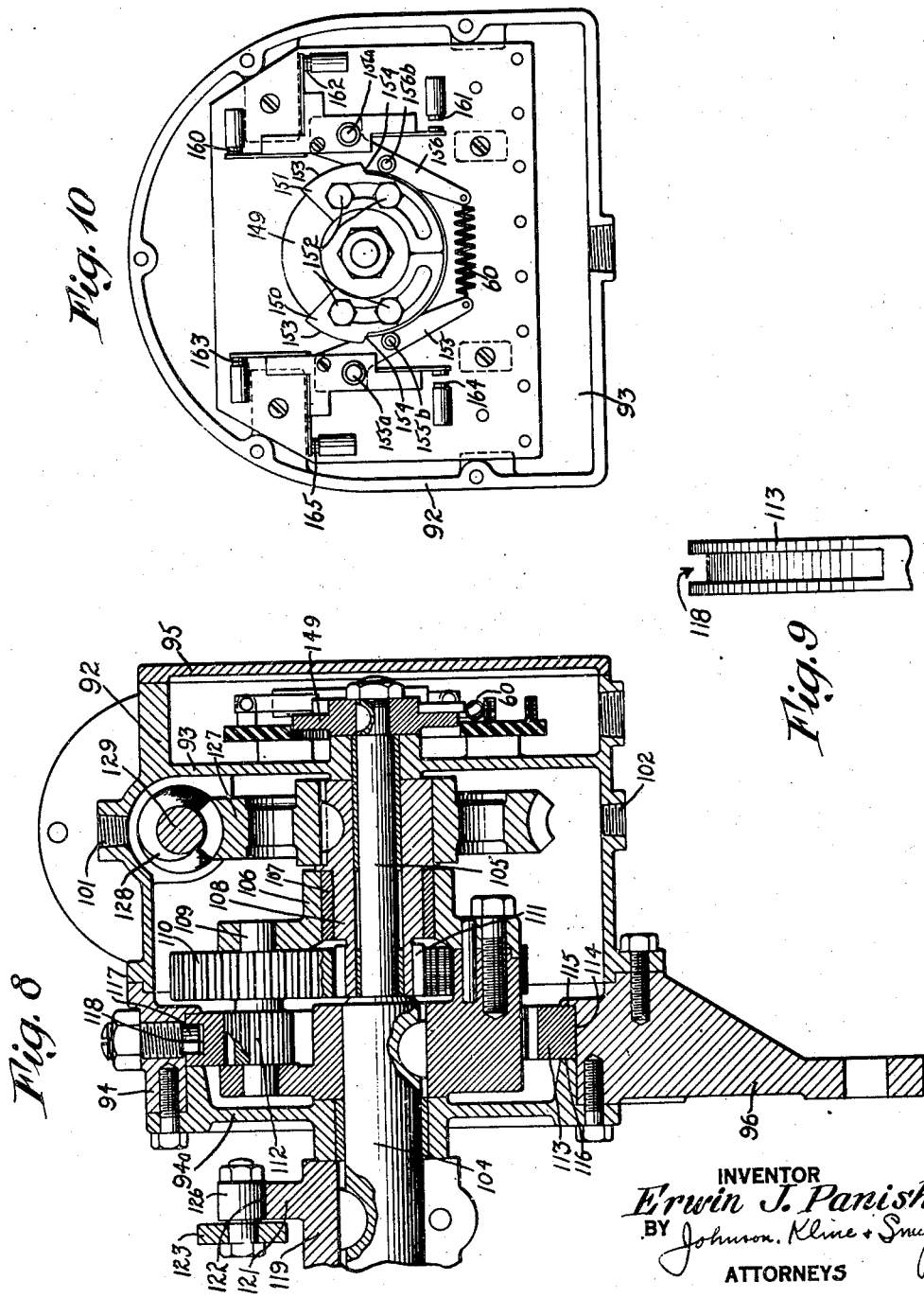

June 29, 1948. E. J. PANISH 2,444,364
CLUTCH AND POWER SUPPLY CONTROL SYSTEM
Filed June 26, 1941 6 Sheets-Sheet 6

INVENTOR
Erwin J. Panish
BY Johnson, Kline & Smyth
ATTORNEYS

Patented June 29, 1948

2,444,364

UNITED STATES PATENT OFFICE 2,444,364

CLUTCH AND POWER SUPPLY CONTROL SYSTEM

Erwin J. Panish, Bridgeport, Conn.

Application June 26, 1941, Serial No. 399,951

21 Claims. (Cl. 192—.01)

This invention relates to controls for prime movers, and, more particularly, to means adapted for remotely controlling the clutch and/or reverse gear of internal combustion engines as used in conveyances such as vessels, and the throttle or speed controlling means of such prime movers.

In the operation of small vessels, especially those which are put to hard service such as coast guard cutters which must be extremely maneuverable and which must be operated in close quarters and more or less instinctively, the problems of controlling the operation of the reverse gear from neutral to forward, or neutral to reverse, or from either operating position to the other and at the same time regulating the speed of the engine, were serious ones.

In maneuvering in close quarters, it is frequently desirable to quickly change from full speed ahead to full speed astern; yet, unless extreme care was exercised in performing this operation, there was heretofore the possibility of an attempt being made at this maneuver without first retarding the engine.

In the case of a high speed engine operating at substantially open throttle under load, considerable damage to the structure of the vessel, as well as to the parts of the engine, is very likely to occur should the load suddenly be removed, and in a heavily powered small craft this might be sufficient to tear the engine from its bed. On the other hand, if the shift occurred quickly enough so that the clutch would engage the propeller shaft through the reverse gear before the motor had an opportunity to race, the sudden reverse of the drive applied to the propeller shaft might shear the propeller shaft or some part of the coupling means between the propeller, propeller shaft and engine.

To aviod these dangers, it was necessary for the operator to first operate the throttle control lever to retard the engine to a more moderate speed, then operate the reverse gear lever to shift the reverse gear clutch through neutral to reverse, and then again operate the throttle control lever to advance the engine. The difficulty is further aggravated when the vessel contains two or more engines, and, unless the operator is extremely attentive to what he is doing, serious damage to vessel and engine, or both might easily result.

Heretofore, it was proposed to operate the clutch and throttle electrically in which cases a single switch lever controlled the necessary circuits and no positive mechanical control over the throttle from the operating station was had. Hence, if the electric power or the wiring system failed, the speed of the engine could not be controlled by the single control lever but resort must be had to a separate throttle lever provided for such emergency use, in which case the proper sequence of operation above referred to must be observed by the operator. Besides, such previous proposals were necessarily slow-acting and consumed electrical current for the control of the speed of the engine.

An object of this invention is to provide improved control means obviating the difficulties above referred to and greatly facilitating the operation of the clutch and/or reverse gear between a prime mover and a driving member—for example, between an internal combustion engine and a propeller shaft of a vessel—and for coordinately and mechanically operating the speed controlling means of the prime mover—for instance, the throttle of an internal combustion engine.

To this end, one of the important features of the present invention is the provision of a single manually operated control lever, the operations of which control the reverse gear and also actuate the throttle, said operations being so coordinated that the throttle cannot be manually advanced to a high speed position until the clutch of the reverse gear engages, and, likewise, that the throttle is manually retarded before the clutch of the reverse gear is disengaged.

With the control of the present invention, the operator, in performing the maneuvers above referred to, merely moves the single control lever forwardly to go full speed ahead—the first movement causing the clutch to engage for forward direction, and the continued movement manually advancing the throttle. While going full speed ahead, if full speed astern is desired, the operator merely moves the control lever rearwardly—the first movement closing the throttle to retard the engine, and the continued movement causing the clutch to release; then, going through neutral, the continued movement of the lever rearwardly first causes the clutch to engage for astern operation, and the continued rearward movement advances the throttle. The operations of the clutch and throttle are automatically performed in the proper sequence without special attention on the part of the operator.

If in this manual operation, the control lever of the present invention is operated as one would normally operate the gear shift lever of an automobile during which time the clutch-shifting mechanism can operate, most of the difficulties above referred to attendant upon the maneuvering of a vessel will be obviated. However, the operator may, in excitement or thoughtlessly, attempt to jam the control lever from full speed head to full speed astern, for instance, without giving the mechanism for shifting the reverse gear clutch sufficient time to operate.

Another feature of the present invention is, therefore, the provision of means for positively preventing the movement of the throttle to above normal clutch-engaging speed until the clutch of the reverse gear has been engaged. For this purpose, the manually operable control lever is provided with a locking device, remotely controlled by the reverse gear, which is released when the reverse gear has moved to a position where the clutch engages and then permits the throttle to be manually advanced or retarded at will.

The controller may be arranged in the manner of a ship's telegraph, and is usually located in the pilot house adjacent the wheel. Frequently, however, it is desired to have two control stations on the vessel—one in the pilot house and the other on the deck or flying bridge. Heretofore, manually operated control means for the throttle have been respectively permanently mechanically interconnected so that these parts could be operated from either operating station, but, if either developed mechanical difficulty so that it could not be operated, it rendered the other inoperative. Besides, such permanent mechanically interconnected dual controls has the further disadvantage that two operators at the same time could have control of the engine, and, if they acted at cross purpose, considerable difficulty would obviously arise.

According to the present invention, these difficulties are avoided by the provision of two or more independent control stations and an independent selector whereby, normally, the operations performed at either station (but not both stations) are transmitted to the engine controls. Thus, according to the present invention, if the station in the pilot house has the responsibility of the vessel, the control of the vessel could not be taken over from the bridge unless the selector device, which is usually located in the pilot house, was first operated.

In multi-engine vessels, a controller is provided for each engine, and, according to the present invention, the control for the port engine and the control for the starboard engine may be combined in a single control device so as to make for economy and convenience in operation. When, as is illustrated herein, the control levers for the port and starboard engines are mounted in close proximity, their operating handles may be brought so close together that they can be operated together forwardly or backwardly by pushing or pulling with one hand. By the same token, the closeness of the handles of the two control levers permits one lever to be moved forwardly while the other lever is moved rearwardly by a twist of the hand embracing the two handles, and this is a great convenience where steering is performed by running one engine, say the port engine, forwardly, while the other engine, say the starboard engine, is running rearwardly.

Again, by having the handles of the levers in such close proximity that they can be embraced with one hand while the levers are being moved forwardly or rearwardly by twisting the hand either clockwise or counterclockwise the levers may be advanced differentially, thereby causing one engine to be accelerated or retarded with respect to the other to synchronize them. The control device per se of the present invention is described and claimed in a separate application, Serial No. 399,950 filed concurrently herewith now Patent #2,358,094 issued September 12, 1944.

When there are two engines and two differently located control stations, each engine is provided with a selector so that either station may control both engines.

The means for operating the clutch for the reverse gear illustrated herein is an improvement upon that shown in my copending application Serial No. 352,499, filed August 14, 1940 now Patent #2,323,619, dated July 6, 1943, which improvement will more fully appear below. Suffice it to say here that upon operation of the control lever, a motor connected to the clutch shaft of the reverse gear operates to shift said shaft and cause the clutch to engage either for forward operation or reverse operation, whereupon, by a torque responsive device, the motor circuit is automatically opened and rendered inoperative until a reverse operation of the control lever occurs. When the clutch shifting shaft of the reverse gear has been operated to a position where the clutch becomes engaged, means provided by the present invention automatically release dogs or latches, normally preventing continued advance of the control lever, so that the control lever may be advanced to open the throttle and advance the speed of the engine.

In case of accident or mechanical failure of some of the parts, it may be desirable to operate the reverse gear shaft by hand, using the emergency lever usually provided for that purpose. In this case, by means provided by the present invention, the control lever dogs may be rendered inoperative, permitting the throttle to be operated over its entire range without interference. Of course, in such an emergency operation, the same care with regard to the sequence of operations as first referred to above would have to be exercised.

A preferred embodiment of the control system of the present invention is described hereinafter and illustrated in the accompanying drawings, in which:

Figure 1 is a schematic view of the control system of the present invention for a single prime mover comprising a pair of control stations, the interior of one and the exterior of the other being illustrated; a switch-over device with its cover plate removed to show the interior mechanism thereof; and a reverse gear-actuating mechanism in side elevation together with fragmentary portions of engine mechanism controlled thereby, including a reverse gear operating shaft and a throttle control lever.

Fig. 2 is a view in front elevation of the reverse gear control mechanism viewed from the coupling end of the main drive shaft.

Fig. 3 is an end elevation of the device of Fig. 2, facing the housing of an overload responsive device.

Fig. 4 is a vertical cross-section along the line 4—4' of Fig. 3.

Fig. 5 is a cross-section of the motor coupling along line 5—5' of Fig. 4.

Fig. 6 is a cross-section along the line 6—6' of Fig. 4 showing means for mounting an overload-responsive switch means.

Fig. 7 is a detail of the overload-responsive switch means and the operating cam therefor.

Fig. 8 is a central vertical cross-section of the mechanism taken along the line 8—8' of Fig. 2.

Fig. 9 is a fragmentary detail of a lost motion member in the transmission illustrated in Fig. 8.

Fig. 10 is a rear view of the mechanism of Fig. 2 with the cover plate removed to show portions of the control mechanism.

Figure 11:
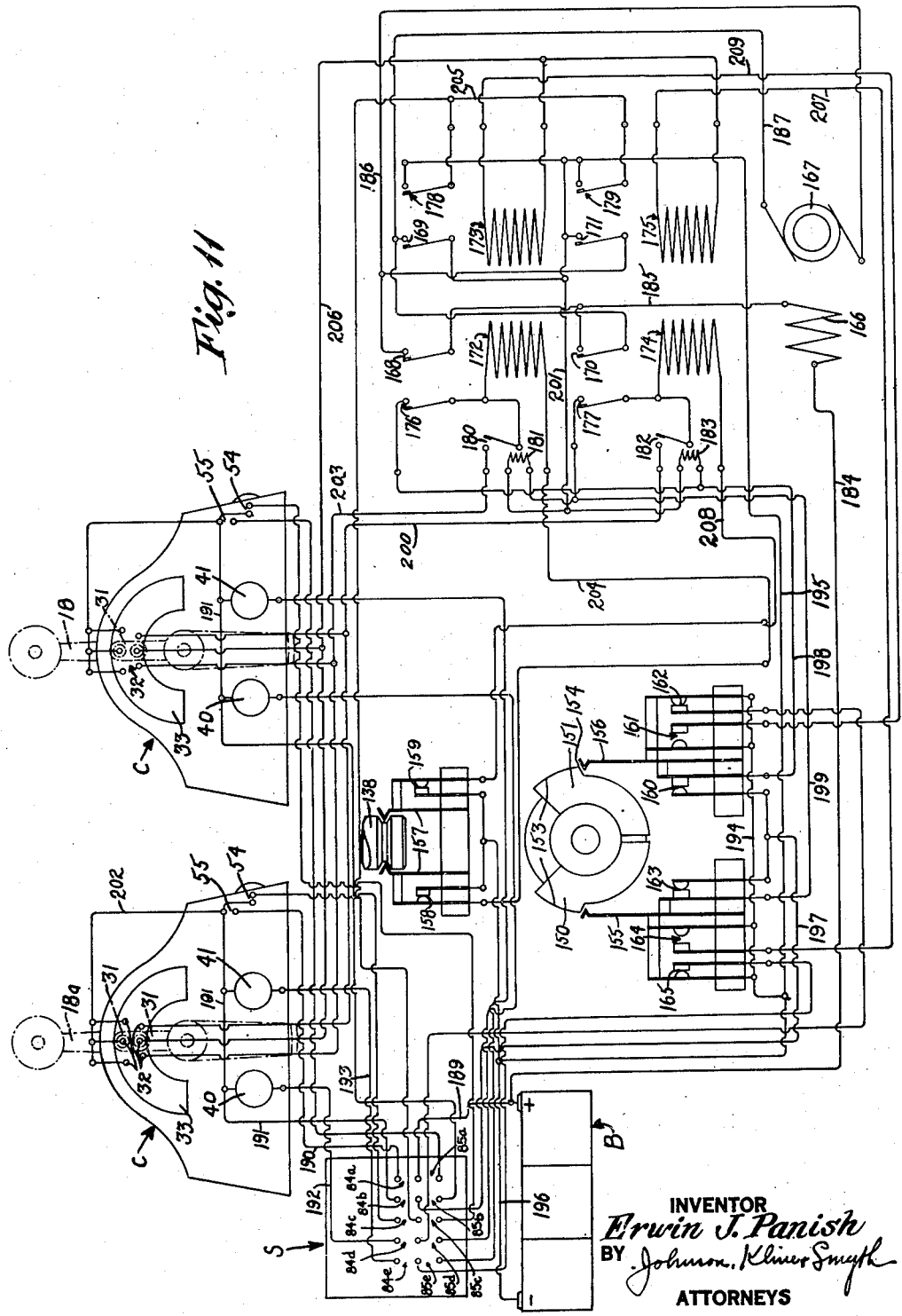
Fig. 11 is a wiring diagram of the control system of Fig. 1.

As illustrated in Fig. 1, the control system of the present invention is arranged to operate the throttle lever 10 of a unidirectional prime mover, such as an internal combustion engine indicated at E, said lever being pivotally movable about one end 11 to adjust the engine throttle.

The system is also arranged to operate a reverse gear, indicated at R, for reversing the direction in which a member, such as the propeller shaft of a vessel, is driven by the prime mover. The reverse gear includes a clutch having two alternately engaged positions for transmitting driving power in opposite directions respectively to the driven shaft, and an intermediate neutral or disengaged position. The reverse gear is usually operated by a shaft 12, arcuately movable between spaced limiting positions, at each side of neutral or disengaged position. During motion of the shaft 12 from neutral to a limiting position, the clutch is generally engaged before the limiting position is reached, continued motion of the shaft thereafter serving to secure the clutch in engaged position.

The means by which the actuating mechanism is operated and which forms a part of the control system of the present invention is indicated as M and is supported by a U-shaped bracket 13 secured to the reverse gear housing. The actuating mechanism also comprises a coupling 14 engaging the shaft 12, a casing 15 and a motor 16 to be more fully described below.

According to the present invention, the operations of the clutch and reverse gear and of the throttle are correlated in such a manner that the former is engaged before the throttle is opened for operating speeds, since engagement at excessive speeds, is liable to shear the propeller shaft, or at least to cause the vessel to lurch forward or backward. Similarly, in disengaging the clutch or reverse gear, it is desirable that the operation be accomplished at reduced throttle setting to avoid racing the engine which might result in damage thereto.

Accordingly, common remote control means for both reverse gear and throttle are provided, said means correlating the operation of the two so that engagement of the former for operation in either direction as well as disengagement occurs at reduced engine operating speeds. The remote control means comprises identical or similar control stations C, which may be located at different separated points, such as the bridge and the pilot house of a vessel.

In order to permit the desired control of the reverse gear clutch as well as the throttle by the single control lever of control station C, the electric control circuits for the motor of the clutch-actuating mechanism are adapted to initiate clutch engagement upon closure of momentary manual contact switches operated by the manual throttle control member, said switches remaining inoperative thereafter during motion of the remote control member for varying the throttle setting as long as the clutch continues engaged. The control circuits are so arranged that motion of the manual control member to idling throttle position will close a circuit for moving the reverse gear to neutral position from either engaged position, and so that motion of the manual control member to an alternate switch-closing position will move the reverse gear to the other engaged position, either from neutral or from the opposite engaged position.

Each control station C comprises a casing 17 having a control lever 18 or 18a mounted thereon for pivotal motion about an axis 19. The control lever extends above the casing of the control station and carries a spherical grip handle 20 at its upper end. The hub 21 of the control lever 18 extends interiorly of the casing and is provided with a radial contact arm 22 extending in the same direction as the control lever. A radial operating arm 23 extends from said hub in the opposite direction. The operating arm 23 carries a substantially semicircular segment 24, the ends of which are adapted to cooperate with a fixed stop 25, carried on the inner wall of the casing, to limit the arcuate range of motion of the control lever. The stop 25 may carry a bolt 26 for adjusting one of the limits of motion of the control lever.

Intermediate the ends of the segment 24, a semicircular recess is provided which cooperates with a roller 27 carried intermediate the ends of a detent lever 28, to form a yieldable detent, retaining the control lever in intermediate position as illustrated in Fig. 1. One end of the detent lever 28 is pivoted at 29 to the casing, while the other end is urged toward the segment 24 by a tension spring 30 also secured to the casing. For reasons hereinafter explained, the angle through which the control lever 18 is movable from the detent-engaging position to one limiting position is somewhat greater than the angle of motion to the opposite limiting position.

The contactor arm 22 carries a pair of insulated contactors 31 electrically joined and adapted successively to bridge three angularly spaced pairs of contacts 32 carried by an insulating support 33, secured to the wall of the casing 17. The contactors 31 are adapted to bridge the middle pair of contacts 32 when the control lever 18 is in the illustrated detent-engaging position.

The operating arm 23 also carries a pivot 57 to which a rigid rod 58 is secured. The latter is slidably supported in a sleeve 59, the lower end of which is attached by means of a ball and socket joint to a Bowden wire sheath 61 which is clamped at 62 to a portion of the frame of the control station. The rod 58 is connected to a Bowden wire 63 which is thereby adapted to be operated by motion of the control lever 18. When the control lever 18 is in substantially vertical position as shown, with contactor 31 bridging the middle pair of contacts 32 and detent roller 27 engaging the recess of segment 24, the Bowden wire is pushed outward by the control lever 18 to the limit of its motion. Movement of the control lever in either direction from this position toward either limiting position retracts the Bowden wire through its sheath, sleeve 59 pivoting about its ball and socket joint to permit free operation of the control lever.

The Bowden wire 63 operates the throttle control lever 10, while the circuits closed by contactors 31 bridging contacts 32 are adapted to operate the motor 16 of the reverse gear-actuating mechanism. Bridging of the pair of contacts 32, shown at the left in the control station C, initiates motor operation for forward engagement of the reverse gear clutch, while bridging of the contacts to the right closes a circuit for initiating motor operation to engage the reverse gear clutch for reverse operation. Bridging of the middle pair of contacts 32 closes the motor circuit for returning the reverse gear to neutral or disengaged position.

Means is also provided according to the present invention for preventing substantial increase of the throttle setting until the clutch is engaged, said means automatically releasing the manual control means so that the throttle may be adjusted between idling and full speed settings only after engagement of the clutch, and said throttle limiting means becoming operative again upon disengagement of the reverse gear clutch.

This automatic control means is illustrated as comprising a pair of latch levers 34 and 35, supported on a depending portion of the casing and pivoted respectively at 36 and 37 thereto. The latches are provided respectively with hook-like projections 38 and 39 adapted to extend into the path of the lower end of operating arm 23 for limiting the motion of the control lever 18. The latches are adapted to arrest motion of the control lever toward its ultimate limiting positions when contactors 31 bridge one or the other pair of contacts 32 on opposite sides of the middle pair of contacts.

At opposite ends of said casing below the said latches, a pair of solenoids 40 and 41 are secured in mutual coaxial alignment. The solenoids carry a pair of armatures 42 and 43 projecting toward each other, and joined by a tension spring 44 which normally urges them toward each other and away from the solenoids. However, when the solenoids are energized, the said armatures are retracted against the tension of spring 44, into the respective solenoids.

The ends of armatures 42 and 43 are joined respectively by pivotal links 45 and 46 to the movable ends of latches 34 and 35 so that when the armatures are retracted by the solenoids, the latches are raised to operative position, but when the armatures are withdrawn for instance by spring 44, from the solenoids, the latches are lowered to permit the control lever 18 to move beyond the latch-engaging positions toward its ultimate limiting positions.

A pair of links 47 and 48 which are pivotally secured to the casing 17 below armatures 42 and 43 are also respectively joined to the ends of said armatures, and carry projections 49 and 50 having stop means comprising the pins 51 and 52 adapted to engage the sides of links 45 and 46 respectively to limit the retraction of the armatures 42 and 43 by the solenoids 40 and 41. When the said stop means are effective, links 45 and 47 and links 46 and 48 are disposed to form slightly less than a straight angle so that pressure applied to projections 38 and 39, tending to depress the latches, is adapted to collapse the said pairs of links and withdraw the armatures from the solenoids. The lower end of operating arm 23 is provided with a cam surface 53 which urges projections 38 and 39 downward when the control lever is pushed toward one or the other limiting position. Thus, the latches are self-releasing when the solenoids are deenergized, the spring 44 merely facilitating the release of the latches.

Solenoids 40 and 41 are energized by circuits automatically controlled by the reverse gear-actuating mechanism, so that latches 34 and 35 are released respectively only after the reverse gear has been engaged for reverse or forward operation, and are reenergized to reset the latches during disengagement of the reverse gear.

The operating arm 23, which correlates the control of the throttle of the engine with operation of the reverse gear when positioned as illustrated in control station C of Fig. 1 so that detent roller 27 engages the recess of segment 24, adjusts the throttle for idling speed by maximum projection of the Bowden wire 63 through its sheath while motion of the control lever in either direction away from the said position, advances the throttle setting by withdrawing the Bowden wire through its sheath. Upon motion to either of the latch-engaging positions, wherein operation of the reverse gear-actuating mechanism for engagement is initiated, the throttle is not materially advanced since the angular displacement of the arm 23 is small and principally at right angles to the Bowden wire rod 58, so that corresponding displacement of the latter through its sleeve 59 advances the throttle only slightly, or is effective merely to take up the slack in the Bowden wire and the mechanical members operated thereby.

Operation of the latches limits the throttle setting to the resulting reduced operating speed until the reverse gear is engaged, whereupon the engaged latch is automatically released and the throttle may be advanced or retarded as desired. Thus, advance of the throttle without engaging the reverse gear clutch, which would result in racing of the engine and probable damage to the mechanism, as well as engagement of the clutch while the engine is operating at high speeds, which might result in shearing of the propeller shaft or lurching of the vessel is effectively prevented.

Disengagement of the reverse gear occurs only upon return of the control lever to the said intermediate detent-engaging position in which the middle pair of contacts 32 is bridged and the throttle is adjusted for idling speed. Thus, racing of the engine upon disengagement of the reverse gear is also rendered impossible.

Since only one latch is released at a time, the other latch prevents increase of the throttle setting beyond reduced engine operating speed when the control lever is moved from one reverse gear-engaging position through neutral or midposition to the opposite reverse gear position, the latter latch being released when the actuating mechanism has completed its reversing engagement.

In a marine installation, when the reverse gear is engaged for reverse drive, it is generally not desirable to operate the engine at full speed at any time. For this reason, motion of control lever 18 from neutral to the limit of its motion for reverse operation, as determined by stop 25 is less than its motion from neutral to the opposite limiting position for full speed ahead.

One feature of the present invention is the provision of signal means at the control station for providing an observable indication throughout operation of the clutch or reverse gear-actuating mechanism. When the signal is energized, the operator is apprised that the desired operation has begun and when the indication ceases, he is apprised of its completion. If the signal does not respond to a reversing operation of the control lever, failure of some part of the electrical system is indicated. Since the complete operation of the reverse gear mechanism requires a substantially constant, short time interval, failure of the signal to cease its indication gives notice that the mechanism is not operating properly. Such a condition may arise, for instance, because of nearly complete discharge of the battery used for driving the motor of the clutch-actuating mechanism.

In the case of failure of the reverse gear or clutch-actuating mechanism to operate properly, it is generally necessary to operate the said mechanism by auxiliary means, for instance, by hand. In such emergencies, it is desired generally to continue operation of the throttle from the remote control station, and for this purpose, it is necessary to render the operation of the common control lever independent of clutch operation.

To this end, according to the invention, means are provided at the control station for simultaneously disengaging the manual control member from the clutch-actuating mechanism and for rendering the latter inoperative, while maintaining the operative relation of the manual control member to the throttle of the engine.

Accordingly, a signal light 54 is provided on one side of the control station, and above it a master switch 55, while at the base, a terminal plate 56 provides means for connecting electrical conductors to the control station.

The signal lamp 54 is arranged to be energized solely during energization of the motor circuit. Thus, when illuminated, it apprises the operator that the desired operation of the reverse gear has been initiated, while when it is extinguished, the operator is informed that the desired operation is completed. Failure of the lamp to go out indicates that the reverse gear has not been operated completely, possibly due to stalling of the motor, while failure of the lamp to illuminate indicates that the motor switch has not closed, probably due to failure of the electric control circuits.

The master switch 55 provides means for rendering all of the electric circuits of the control station operative or inoperative at will to control the reverse gear-actuating mechanism without affecting control of the throttle from said station.

In marine installations, it is often desired to provide a plurality of control stations for clutch or reverse gear and throttle control at different remote stations. For instance, one station may be located, as stated above, on the flying bridge while another may be on the pilot house.

According to the present invention, means are provided, in conjunction with a plurality of control stations having common control members for both throttle and reverse gear of an engine, comprising a switch-over or selector device, separate from the control stations, and having a single operator for transferring both clutch and throttle control from one station to the other.

The use of a selector device of the aforesaid type affords a mechanical interlock which would place the burden of operating the control member of all of the other stations on any one control station as well as the possibility of two operators at separate stations operating the controls at cross purposes. When electric control means are used, it also avoids the possibility of short circuits from differential control of the circuits by operators at separate stations. Provision of a switch-over device separate from the control stations avoids the possibility of inadvertent or mischievous transfer of control from one station to another by a person at an inoperative station. The provision of a single operator for transferring both clutch and throttle control from one station to another avoids the possibility of inadvertently adjusting the system to control the throttle from one station and the clutch from another station.

Hence, intermediate the control stations C and the mechanisms to be controlled thereby, that is, the reverse gear and throttle of an engine, a switch-over or selector device S is provided for transferring the control from one control station to the other. The selector device S as illustrated comprises a casing 64 having a central shaft 65. A pair of spaced levers 66 and 67 are supported for pivotal motion about the axis of the shaft and joined at their movable ends by means of Bowden wires 63 and 63a to the respective control levers 18 and 18a of the control stations C. A pair of rigid control rods 68 and 69, connecting the said Bowden wires with the said levers respectively, are mounted to slide in sleeves 68a and 69a which are held in ball and socket joints 70 and 71, respectively attached to the top and bottom walls of the casing 64. The ball and socket joints are equidistant from the axis of shaft 65 and are disposed on opposite sides of the shaft so that motion of the control lever of either control station is adapted to impart similar angular motion to the respective levers 66 and 67 about the axis of the shaft 65.

Clutch member 72 is mounted on the shaft 65 between levers 66 and 67 and is provided with suitable alterations, such as the recesses 73, adapted to engage corresponding alterations, such as projections 74, on the adjacent sides of levers 66 and 67. Clutch member 72 is slidable axially of the shaft 65 to engage one or the other of said levers alternately, one lever being engaged before the other is released. The clutch-engaging faces of the levers 66 and 67 are so constructed that the clutch member can only be shifted when the levers are in diametrically opposite position, both control levers 18 and 18a being similarly positioned. Thus similar motion of either control lever imparts the same motion to the clutch member 72.

Clutch member 72 is shifted from one engaged position to the other by means of a fork 75 engaging an annular groove on the clutch member, and carried by an operating crank 76, mounted for pivotal motion about axis 77, and adjustable at will by the operator for shifting the clutch member.

The shaft 65 also carries a third lever 78 connected by a rigid rod 79, similar to rod 69 and slidably mounted in a sleeve 79a carried by a ball and socket joint 80 secured to the bottom of casing 64, to a Bowden wire 81 which operates the throttle lever 10. The lever 78 is operatively connected to the clutch member 72 so that it is adapted to be coupled for similar motion by the clutch member to lever 66 or 67 as desired. Lever 78 and rod 79 are angularly disposed in such a manner that motion of rod 69 or 68, depending upon which of the levers 66 or 67 is engaged by clutch member 72, produces similar motion of the rod 79. Thus, the switch-over or selector device transmits motion imparted by control levers 18 and 18a to the Bowden wire 63 or 63a, to the throttle lever 10 through Bowden wire 81 connected to rod 79.

Crank 76 also comprises an extension 82 extending in the opposite direction and terminating in a foot 83 having a cam surface. A plurality of alternately operable microswitches 84 and 85 comprising operating plungers 86 are secured to the casing below said foot and the plungers are adapted to be alternately depressed or released by the said cam surface upon motion of the crank to opposite clutch-engaging positions. The microswitches 84 and 85 may be of the type described and illustrated in United States Patent No. 1,960,020, dated May 22, 1934.

The microswitch plungers 86, when engaged and depressed by the foot 83 are adapted to close microswitches 84, connecting the electric control circuits of one of the control stations C to the circuits of the reverse gear-actuating mechanism, and when released, to close microswitches 85, connecting the other control station in like manner. Thus operation of the switch-over device S, by means of the crank 76, transfers the control of the throttle as well as the control of the reverse gear by a single operation from one control station to the other.

The switch-over mechanism is disclosed and claimed in my patent 2,358,094 dated September 12, 1944.

Cables 88 and 89 carry the conductors for joining control circuits of the respective control stations to the switch-over device S, while cable 90 carries the said circuits to the reverse gear-actuating mechanism and its motor.

Power for the operation of the control circuits and for the motor circuit is derived from a battery B through cable 91, shown as connected to the switch-over device.

Since operation of the reverse gear generally requires more power than can be conveniently applied by direct mechanical operation from a manual remote control mechanism, an auxiliary power-operated mechanism controlled by the manual remote control device is provided to operate the clutch or reverse gear. In this arrangement, the manual control merely initiates the clutch operation, while the mechanism completes it automatically. On the other hand, control of the throttle requires relatively little effort for operation, so that it may be operated mechanically by direct mechanical connection with the manual remote control means.

An improved overload responsive device is provided in the clutch-actuating mechanism of the present invention for rendering the driving motor of the mechanism temporarily inoperative when the clutch has reached an engaged position. In my copending application, Serial No. 352,499 filed August 14, 1940, I have disclosed a clutch-actuating mechanism having overload responsive means for the same purpose. According to the said application, an axially slidable worm drive member is provided in the clutch-actuating mechanism, while a pair of compression springs at opposite ends of the worm shaft support the axial thrust of the worm during its operation in opposite directions. When the torque applied to the worm, and consequently the axial thrust, exceeded a preselected value, one of the springs yielded to permit axial motion of the worm shaft, said motion operating a switch for temporarily opening the motor circuit.

According to the present invention, only a single spring is used for supporting axial thrust of the worm in either direction, the spring yielding to permit operation of the overload switch as in the said copending application. In addition to simplifying the structure of the mechanism, the use of a single spring insures that the overload switches for controlling motor operation in opposite directions will be actuated at the same degree of overload.

Furthermore, in my aforesaid copending application, a lost-motion coupling was provided between the clutch-actuating mechanism and the clutch-operating shaft to permit the motor to start in clutch-disengaging direction substantially under no load, and to deliver a sudden impact to the clutch shaft insuring disengagement of the clutch. The range of the lost motion was preferably constructed to be at least equal to the complete range of motion of the clutch shaft. By this means, hand operation of the latter over its entire range without operating the clutch-actuating mechanism was made possible.

Another feature of the present invention is the provision of a novel lost-motion device in the clutch-actuating mechanism itself, comprising a planetary transmission for coupling coaxially aligned driving and driven members, including an idling gear having limited arcuate motion about the axis of said members, preferably such that the driven member may be operated by external means over its entire range without turning the driver.

The reverse gear-actuating mechanism is shown in detail in Figs. 2 to 10 inclusive. It is housed in a casing comprising a main section 92 having an inner partition 93, an annular bearing member 94 and a bearing plate 94a at one side, and a cover plate 95 on the other side of the partition. A flange 96 is provided to secure the device to the frame of the reverse gear housing.

At one end of the upper portion of section 92, a pair of casing sections 97 and 98 are secured to house an overload control device; while at the opposite end, a casing section 99 housing the motor coupling, and a section 100 housing the motor 16 are provided. An oil filler plug 101 is disposed at the top of section 92 between partition 93 and bearing plate 94, and at the base a drain plug 102 is provided. Intermediate the said plugs, an oil level plug 103 is also provided between the partition 93 and cover plate 95. An aperture is formed at the base of section 92 to accommodate the cable 90 comprising a plurality of electrical connectors.

The main drive shaft 104 of the mechanism is journaled in bearing plate 94a and reduced portion 105 of the shaft is journaled in a bearing at the center of the partition 93 opposite the bearing plate 94. The main shaft 104 carries a frame or spider 106 keyed to the shaft. The spider is provided with a bearing 107 supported by a bearing surface on a sleeve 108 adapted to rotate freely about the reduced portion 105 of the shaft.

The spider 106 carries a number of jack shafts 109, upon each of which is mounted a planetary spur gear 110 engaging an axial spur gear 111 on the adjacent end of the sleeve 108. Each of the jack shafts carries a secondary planetary spur gear 112 keyed for rotation with gear 110 and engaging a ring gear 113. The latter is supported for rotation about the axis of the shaft by an annular bearing surface 114 formed on the interior of the bearing member 94, the ring gear being retained against axial displacement by an annular shoulder 115 on the wall of said casing section, and an annular shoulder 116 on the bearing plate 94a. A stop means 117 projects from the bearing surface 114 into an arcuate groove 118 in the peripheral bearing surface of ring gear 113 in order to limit angular motion of the ring gear about the axis of the shaft to a predetermined angle.

When the sleeve 108 and its spur gear 111 are rotated, the spider 106 and jack shafts 109 remain stationary while the gears carried by the jack shaft rotate the ring gear 113 to the limit of its arcuate motion, where it is arrested by the end of groove 118 reaching the stop means 117. Thereafter, continued rotation of sleeve 108 in the same direction drives the planetary spur gear 110 and causes spur gear 112 to roll around the stationary ring gear 113, describing a planetary path about the axis of the shaft 104 and moving the spider 106 about the said axis. The drive shaft 104, which is keyed to the spider, is similarly rotated. If the direction of rotation of sleeve 108 is reversed, shaft 104 first remains stationary while ring gear 113 moves to the opposite limit of its arcuate motion. Thereafter, planetary motion of the jack shafts 109 in the opposite direction rotates the main shaft 104 in the reverse direction. Thus the ring gear 113 provides a lost motion coupling between the sleeve 108 and the shaft 104.

In the gear train as illustrated, the ratio of gear 111 to the planetary gear 110 is 18:38 while the ratio of planetary gear 112 to ring gear 113 is 14:70. Thus, when the ring gear is stationary, one revolution of sleeve 108 causes the drive shaft 104 to rotate slightly less than one-tenth of a revolution in the same direction; whereas, when shaft 104 and spider 106 are stationary, the ring gear 113 rotates slightly less than one-tenth of a revolution in the opposite direction for each revolution of the sleeve 108.

A coupling member 119 is keyed to the protruding end of shaft 104 and engages a corresponding coupling member 120 on the end of the reverse gear operating shaft 12. As hereinbefore stated, the latter is movable through a limited arc, its limiting positions corresponding to engagement of the reverse gear for drive in opposite directions, while at an intermediate position, the reverse gear is disengaged. By constructing the groove 118 of sufficient arcuate length to permit motion of ring gear 113 through an angle at least as great as the arcuate motion of the operating shaft 12, the lost motion of the gear train between sleeve 108 and shaft 104 permits motion of the reverse gear operating shaft over its entire range by external means, for instance by hand, without turning the sleeve 108, providing the ring gear has been previously moved to suitable idling position. If the mechanism has moved the shaft 104 to an engaged position, the driving sleeve 108 is rotated only during the first operation of shaft 104 over its entire range by the external means, to bring the ring gear to idling position. If the gear train has moved the operating shaft 104 to the neutral position from engaged position, the sleeve 108 is only rotated during the initial hand operation to the same engaged position by external means, and thereafter remains stationary during subsequent external operation of the reverse gear. For hand operation, any suitable form of crank or lever may be temporarily secured to the main operating shaft 12, or the coupling 14.

The coupling member 119 carries a semicircular sector or cam 121 having an arcuate recess 122 approximately at the midpoint of its peripheral surface. A detent lever 123 is pivotally secured at one end to the bearing plate 94a by means of an eccentrically adjustable pivot 124 while its opposite end is urged toward the shaft 104 by a tension spring 125 secured to a projection 125a at the base of the casing. A roller 126 mounted on the detent lever 123 is urged thereby against the peripheral surface of the cam 121 and is adapted to engage the recess 122 in the manner of a yieldable detent, for releasably retaining the shaft 104 in a predetermined position. The position of the shaft 104 at which the detent arrests its motion may be accurately adjusted by rotating the eccentric pivot 124 while the detent is engaged and then tightening the same by means of lock nut 124a. The detent means is provided in order to position the reverse gear operating shaft accurately in neutral, or reverse gear-disengaging position.

For the purpose of driving the sleeve 108, a worm wheel 127 is keyed thereto, adjacent the bearing in partition 93. The worm wheel is driven by a worm 128 carried by worm shaft 129. The latter is journaled in bearings 130 at opposite sides of the casing section 92 and slidably supported in the bearings for limited axial movement.

At one end, worm shaft 129 carries a collar 131, keyed to the shaft, and provided with a pair of radial projections 132. The latter are engaged by a claw 133 keyed to the end of the shaft 134 of the motor. The prongs of the claw are sufficiently long to permit the aforesaid axial sliding motion of the worm shaft without disengaging the motor from the worm shaft.

The claw 133 and projections 132 preferably form a lost motion coupling, as shown, to permit the motor to start at no load when its operation is reversed.

At its opposite end, worm shaft 129 carries the inner race of a ball bearing 135, the outer race of which is secured in a bearing cup 136 on the end of a cam shaft 137. The opposite end of the cam shaft is reduced and threaded to receive an internally threaded cam member 138.

A pair of spring cups 139 and 140 are carried on the cam shaft and urged apart by a compression spring 141 against the bearing cup 136 and a washer 142 secured in place by the cam member 138. The spring cups 139 and 140 are slidably supported by the interior wall of the casing section 97 and respectively engage a pair of annular shoulders 143 and 144. By this means, spring 141 positions the worm shaft in an intermediate position, and opposes axial sliding motion of the worm shaft 129 in either direction. Motion to the right in Fig. 4 causes bearing cup 136 to move spring cup 139 to the right, compressing spring 141 which is supported by the other spring cup 140 shouldered against the annular shoulder 144. Motion of the worm shaft to the left causes washer 142 on cam shaft 137 to move spring cup 140 to the left, compressing the spring 141 which is now supported by spring cup 139 abutting the shoulder 143. As a result, the resistance to equal displacements of the worm shaft in opposite directions from its normal intermediate position is the same.

When the motor 16 drives worm wheel 127, which is secured to the sleeve 108, through the worm 128, an axial thrust is set up thereby in the worm shaft which is substantially proportional to the torque transmitted by the worm. The direction of rotation determines the direction of thrust, but for either direction, the thrust is supported by spring 141 as hereinbefore explained. However, when the torque exceeds a predetermined value as, for instance, when the reverse gear reaches one of its engaged positions and motion of the operating shaft 12 is arrested, the worm wheel 127 is held stationary and continued rotation of the motor causes the worm to screw through the teeth of the worm wheel, displacing the worm shaft 129 in axial direction, while spring 141 yields under the overload thrust. Cam shaft 137 and the cam member 138 carried thereby are correspondingly displaced.

The overload switch device is mounted on a ledge 146 at the end of casing section 98. It comprises a yoke 147 carring a pair of resilient operating arms 157 with their free ends bent to form a pair of V-shaped cam followers 157a which normally extend into an annular groove 138a flanked by cam surfaces 145 on the cam member 138. When thus positioned, the arms 157 close the two switches 158 and 159, each of which comprises a fixed contact, and a movable contact joined to one of said operating arms, said contacts being insulatedly carried by the ends of yoke 147. An insulating terminal plate 148 depends from ledge 146 and is adapted to carry the terminals providing connections for the said contacts.

Switches 158 and 159 are included in the control circuits of the motor, and are adapted to interrupt motor operation when they are opened. Thus whenever cam member 138 is displaced in either direction in response to an overload condition as above described, cam surfaces 145 engage cam followers 157a, spreading operating arms 157 apart, and opening switches 158 and 159 to render the motor temporarily inoperative.

The control circuit for the motor is preferably arranged so that return of the worm shaft to its original position after operation of the motor has been interrupted thereby will not of itself reenergize the motor. The angle of the threads of the worm 128 is constructed sufficiently steep so that the worm is overhauling or nonlocking. Thus, upon interruption of motor operation, spring 141 is adapted to return the worm shaft 129 to its original position by causing the worm 128 to screw backward through the teeth of the stationary worm wheel 127. This resets the cam member 138 and the overload switch means controlled thereby to their original condition and at the same time relieves the operating shaft 12 of the reverse gear from operating force in engaging direction. As a result, excessive wear of the reverse gear is avoided.

The end of the reduced portion 105 of the main operating shaft protrudes through the partition 93 and carries a plate 149 to which a pair of cams 150 and 151 are secured by means of bolts 152 extending through arcuate slots in the said cams. By this means, the angular position of the cams about the axis of the shaft may be adjusted over a limited range.

Each of the cams comprises an arcuate cam surface 153 terminating at a shoulder 154. A pair of operating arms 155 and 156 pivoted respectively at 155a and 156a, carry a pair of cam followers 155b and 156b extending into the paths of said cams respectively and urged toward the cams by a spring 60 joining the ends of the arms. The cams are so adjusted that neither cam follower is engaged by the cams when the reverse gear-actuating mechanism is in its intermediate neutral position; that is, when the detent roller 126 engages the recess 122 on the sector cam 121. However, the said cam followers are alternately engaged upon rotation of the main drive shaft away from neutral position in opposite directions during operation of the mechanism M for engagement of the reverse gear, and fully displaced by the said cams by the time the reverse gear clutch is engaged for operation in either direction.

Each of the operating arms 155 and 156 is adapted to control a number of limit switches 160, 161, 162, 163, 164 and 165 for operating the motor circuits, signal lamp circuits and latch solenoid circuits during operation of the actuating mechanism M.

The circuits of the control stations, the switchover device, and the reverse gear-actuating mechanism whereby the desired operation is obtained are illustrated in the wiring diagram of Fig. 11. The battery, indicated at B, is the source of power for the system.

In the schematic illustration of the control stations C in Fig. 11, three pairs of contacts 32 are shown on each of the insulating plates 33, while control levers 18 and 18a carry contactors 31 for bridging the said contact pairs. At the right-hand side of each control station, master switch 55 and signal lamp 54 are indicated, and near the base, the two latch solenoids 40 and 41 are shown. The two control stations C are similar in every respect.

In the selector device S, alternately operable microswitches 84 and 85 are shown as a pair of five-pole switches comprising respectively individual switches 84a, b, c, d, and e, and corresponding individual switches 85a, b, c, d, and e.

The cam 138 of the overload responsive device is illustrated as adapted upon motion in either direction to engage the operating arms 157 of overload switches 158 and 159 to open the said switches.

The cams 150 and 151 on the end of the main drive shaft are shown with their cam surfaces 153 in the position which they occupy when the reverse gear is in neutral position, both operating arms 155 and 156 being released. Upon clockwise rotation of the cams, operating arm 156 is engaged by shoulder 154 and moved to the right, first opening limit switches 160 and 162, and then closing switch 161. Similarly, by counterclockwise rotation, arm 155 is engaged by cam 150, first opening limit switches 163 and 165, and then closing switch 164, the switch operations being reversed upon return of the reverse gear to neutral position.

The motor comprises a field winding 166 and an armature 167, the power circuit thereof being controlled by switches 168, 169, 170 and 171. Closure of switches 168 and 169 causes the motor to rotate in one direction, while closure of switches 170 and 171 causes rotation in opposite direction. For instance, for operation to move the reverse gear toward forward engaged position, switches 168 and 169 are closed, and the motor circuit is energized from the positive pole of battery B through lead 184 to field winding 166, thence through lead 185, switch 168, and lead 186 to one side of armature 167, then through lead 187, switch 169 and leads 201, 195, 196 to the negative pole of the battery. For reverse operation, the direction of the current through the armature is reversed, switches 170 and 171 being closed; the field winding is similarly energized from the positive terminal of the battery, the circuit from the field traversing lead 185, switch 170, and lead 187 to the opposite side of the armature, thence through lead 186 and switch 171 to lead 201 and back again to the negative terminal of the battery. The motor is series wound to provide relatively high starting torque.

Either of a pair of electromagnets 172 and 173 are adapted upon energization to close switches 168 and 169, while a pair of electromagnets 174 and 175 are similarly adapted to close switches 170 and 171. A holding switch 176 is provided in the circuit of electromagnet 172 and a similar switch 177 is provided in the circuit of electromagnet 174. A pair of switches 178 and 179 are both effective, upon closure, to energize the signal lamp 54 in the control station. Switches 176 and 178 are closed simultaneously with switches 168 and 169, during operation of the motor for moving the reverse gear toward forward engaged position, while switches 177 and 179 are closed simultaneously with switches 170 and 171 during operation of the motor in the opposite direction.

Switches 168, 169, 176, and 178 are preferably connected, as is usual in reversing switches, by means of a mechanical interlock with switches 170, 171, 177 and 179 to insure that only one set will be closed at a time, thus avoiding any possibility of a short circuit.

An initiating circuit for electromagnet 172 comprises switch 180 which is closed by energization of an electromagnet or relay 181, while a similar initiating circuit for solenoid 174 comprises switch 182 which is closed by energization of an electromagnet or relay 183.

The system is shown with its mechanical elements in the positions which they occupy when the reverse gear is in neutral position. In the selector device S, microswitch 84 is closed while switch 85 is open, rendering the left hand control station C operative to control the system, and the right-hand control station inoperative. The master switch 55 of the selected control station is open so that the electric circuits are inoperative.

Operation of the system is as follows:

Upon closure of the master switch 55, the latch solenoids 40 and 41 and electromagnets 181 and 183 are simultaneously energized. Their circuits may be traced from the positive terminal of the battery through lead 189, microswitch 84a, and lead 190 to the master switch 55; from the latter through lead 191 to solenoids 40 and 41; thence through leads 192 and 193, including microswitches 84d and 84e to the closed limit switches 162 and 165; and thence through leads 194, 195 and 196 to the negative terminal of the battery. The circuits of the electromagnets 181 and 183 are energized from the master switch 55, through lead 191, microswitch 84b, lead 197, limit switches 160 and 163, and leads 198 and 199 to electromagnets 183 and 181; thence through leads 201, 195 and 196 to the negative terminal of the battery.

As hereinbefore stated, energization of the solenoids 40 and 41 renders the latches 34 and 35 at control station C operative to limit motion of control lever 18 so that it can only be moved to the positions wherein the contact pairs 32 on opposite sides of the middle pair are bridged by contactor 31, while the throttle of the engine is not materially advanced from idling speed. Energization of electromagnets 181 and 183 causes switches 180 and 182 to close, thus establishing the initiating circuits for energizing electromagnets 172 and 174 respectively.

When it is desired to engage the reverse gear clutch for "forward" operation, control lever 18 is moved to the left, bridging the left-hand pair of contacts 32, without materially advancing the throttle. This energizes electromagnet 172 from master switch 55, through lead 202, contacts 32, lead 203, and switch 180 to the said electromagnet, and thence through lead 204, overload switch 158, and lead 196 to the negative terminal of the battery.

Energization of electromagnet 172 closes motor switches 168 and 169 causing the motor to begin its operation of the reverse gear-actuating mechanism toward forward engaged position. Switches 176 and 178 are also closed at the same time, the former establishing a holding circuit which shunts the manually closed switch at the left-hand pair of contacts 32 and the initiating circuit switch 180, but not the overload switch 158, and thus maintains energization of electromagnet 172, subject only to operation of the overload switch 158. The holding circuit may be traced from the master switch 55 through lead 191, microswitch 84b, lead 197, limit switch 160, lead 198 and holding switch 176, to the electromagnet 172. Switch 178 closes the circuit of the signal lamp 54 from the master switch 55 through said lamp; then through lead 205 including microswitch 84c, switch 178, and leads 195 and 196 to the negative terminal of the battery.

When the motor begins its operation, and after the above described lost-motion device in the actuating mechanism M has reached the limit of its idling motion, the main drive shaft 104 is rotated so that cams 150 and 151 move in clockwise direction. During this operation, but before the clutch operating shaft reaches the limit of its arcuate motion, limit switch 163 is opened by engagement of cam 150 with operating arm 155, opening the circuit through relay 181 and thereby causing initiating switch 180 to open. Thereafter, the circuit through electromagnet 172 is maintained solely by the holding circuit including holding switch 176, and as long as the reverse gear remains engaged, repeated closure of the manual control switch, comprising the left-hand pair of contacts 32, has no effect upon the system. This manually operated switch becomes effective again only after return of the reverse gear to neutral position, whereupon the relay 181 is reenergized and initiating switch 180 reclosed.

After limit switch 163 is opened, the limit switch 164 is closed by operating arm 155 to establish a circuit for moving the reverse gear to neutral position.

Moreover, after the reverse gear is engaged for forward operation, the limit switch 165 is opened by operating arm 155, thereby deenergizing solenoid 41 and releasing the latch 35 so that the operating lever 18 may be moved beyond the position at the left-hand pair of contacts 32 to its limiting position for advancing the throttle setting, or back toward its mid position for reducing the throttle setting, without further effect upon the clutch-actuating mechanism. In the mechanism as illustrated, limit switches 163 and 165 are opened simultaneously, since the clutch is already engaged before the clutch operating shaft 12 reaches the limit of its arcuate motion.

After the main operating shaft 12 of the reverse gear reaches the limit of its motion, the worm wheel 127 in the actuating mechanism M is arrested and cam 138 is displaced longitudinally by the worm 128 screwing through the worm wheel 127, accompanied by compression of the spring 141, which opposes displacement of the worm and of the shaft 129. Operating arms 157 are engaged by the cam 138 opening overload switch 158 and interrupting the holding circuit through electromagnet 172, allowing switches 176, 168, 169 and 178 to open. The circuit to the electromagnet 172 is thus interrupted at holding switch 176 so that upon reclosure of switch 158 by return of the worm shaft 129 to its original position under the influence of spring 141, motor operation is not resumed. Switches 168 and 169 open the motor circuit and interrupt motor operation, while switch 178 opens the circuit to the signal lamp 54 indicating that the engagement of the reverse gear is complete.

Since the worm 128 is overhauling, the spring 141 causes it to screw backward through the worm wheel 127, allowing the cam 138 to resume the position shown in Fig. 11, and reclosing overload switches 158 and 159.

When it is desired to return the reverse gear to neutral position, control lever 18 is moved back to its midposition wherein contactor 31 bridges the middle pair of contacts 32. The throttle is simultaneously adjusted for idling speed. Bridging of the said contacts closes a circuit through electromagnet 175, from the master switch 55 through lead 202, the middle pair of contacts 32, lead 206 to electromagnet 175, and thence through lead 207, limit switch 164 (which was closed during operation of the reverse gear for forward engagement), leads 194, 195 and 196 to the negative terminal of the battery.

Energization of electromagnet 175 closes switches 170 and 171, causing the motor to rotate in the reverse direction, moving the reverse gear toward neutral. Switch 179 simultaneously closes the circuit to signal lamp 54. Switch 177 is also closed, but is inoperative since the circuit controlled thereby is interrupted at limit switch 163.

The lost-motion device of the reverse gear-actuating mechanism operates initially to permit the motor to start under substantially no load, and to deliver a sudden impact to the main operating shaft 12 of the reverse gear when it reaches the limit of its lost motion, which insures disengagement of the reverse gear.

As the reverse gear approaches neutral position, cam 150 releases operating arm 155, causing switch 165 to reenergize the solenoid 41, and thus resetting the latch 35 controlled thereby for limiting motion of the control lever 18. Switch 164 opens to interrupt the circuit of electromagnet 175 thereby causing switches 170, 171, 177 and 179 to open, interrupting motor operation, deenergizing the signal lamp 54 and opening the holding circuit of electromagnet 174, while directly thereafter, limit switch 163 in the said holding circuit is closed, but since switch 177 is open the circuit remains inoperative. Switches 163 and 164 must operate alternately so that energization of electromagnets 174 and 175 does not overlap by simultaneous closure of holding switch 177 and limit switch 163. Otherwise, the motor would fail to stop when the reverse gear reaches neutral position, but due to successive overlapping energization of the said electromagnets would continue its operation to reverse engaged position.

Detent roller 126 finally engages the recess 122 in the sector cam 121 on the reverse gear operating shaft, thereby accurately positioning the reverse gear in neutral position.

For operation to reverse engaged position, the control lever 18 is moved to the right until it engages latch 34 controlled by solenoid 40, whereby contact 31 bridges the right-hand pair of contacts 32 without materially advancing the throttle. Meanwhile, the relay 183 which is energized through limit switch 160, holds initiating switch 182 closed. Thus a circuit through electromagnet 174 is completed from the master switch 55 through lead 202 to the right-hand pair of contacts 32, then through lead 200, switch 182, to electromagnet 174, and then through lead 208, overload switch 159, and lead 196 to the negative terminal of the battery.

Switches 170, 171, 177 and 179 are closed thereby. The first two switches initiate motor operation to move the reverse gear to reverse engaged position, while switch 179 energizes signal lamp 54, and switch 177 closes the holding circuit from the master switch 55 through lead 191, microswitch 84b, lead 197, limit switch 163 and lead 199 to the electromagnet 174, shunting the initiating switch 182 and the manual control switch comprising the right-hand pair of contacts 32.

The drive shaft of the reverse gear operating mechanism rotates cams 150 and 151 clockwise, causing the latter to open switch 160, deenergizing the relay 183 and opening initiating switch 182. Thereafter, the aforesaid holding circuit alone maintains energization of electromagnet 174. Switch 161 is subsequently closed to establish a circuit for returning the reverse gear to neutral; while switch 162 is opened after the reverse gear is engaged, thereby deenergizing solenoid 40 and releasing latch 34 so that the throttle setting of the engine may be advanced or reduced at will by means of operating lever 18. Repeated engagement of the right-hand pair of contacts 32 by contactor 31 during throttle operation by control lever 18 is ineffective as long as the reverse gear is engaged for reverse operation, since the circuit controlled thereby is open at initiating switch 182.

After the reverse gear actuating mechanism reaches the limit of its motion, the overload responsive cam 138 is displaced against the opposing force of compression spring 141, thereby opening overload switch 159 and deenergizing the electromagnet 174. This opens motor switches 170 and 171, as well as holding switch 177 and signal lamp switch 179, thereby arresting operation of the motor, deenergizing the signal 54, and interrupting the holding circuit of electromagnet 174. Thereafter, cam 138 is moved back to its original position by operation of the spring 141 on the overhauling worm 128, reclosing overload switch 159 to reestablish the holding circuit of the said electromagnet.

The return of the reverse gear to neutral position from reverse engaged position is similar to return from forward engaged position. Control lever 18 is first moved to its midposition energizing the circuit of electromagnet 173 from master switch 55, through leads 202, and 206, and from electromagnet 173, through lead 209, limit switch 161 (which was closed during operation of the reverse gear to reverse engaged position), and leads 194, 195 and 196 to the negative terminal of the battery B.

The electromagnet 173 closes switches 168 and 169 causing the motor to move the reverse gear toward neutral position. The lost motion device permits the motor to start at no load, and provides an impact or hammer blow to insure initial disengagement of the reverse gear clutch. During operation of the mechanism, limit switch 162 is reclosed as cam 151 begins to release operating arm 155, reenergizing the latch solenoid 40 and thus resetting latch 34. Limit switch 161 is opened, deenergizing electromagnet 173 and opening motor switches 168 and 169, lamp switch 178 and holding switch 176. Finally, switch 160 is closed reestablishing the holding circuit of electromagnet 172 which remains open however at holding switch 176. The detent roller 126 again engages the recess 122 of the sector 121 to position the reverse gear accurately in neutral position.

When the reverse gear is engaged, for instance, for forward operation, it is sometimes desired for rapid maneuvering to shift directly to reverse engagement. The control lever 18 which is movable for throttle control over its entire range on the left of the middle pair of contacts 32 while the reverse gear is engaged for forward operation, is moved through neutral to the right until its contactor 31 bridges the right-hand pair of contacts 32, latch 34 arresting it in this position. The throttle is thereby limited to adjustment for reduced engine speed.

Since limit switch 160 is initially closed, the relay magnet 183 is energized and initiating switch 182 is closed. Thus bridging of the right-hand contacts 32 energizes electromagnet 174, closing switch 170 and 171 for reverse motor operation and also holding switch 177 and signal lamp switch 179. As the reverse gear mechanism approaches neutral, the operating arm 155 is released by cam 150, closing switch 163 which energizes the holding circuit including the holding switch 177 to the magnet 174. After the reverse gear passes the neutral position, switch 160 opens, deenergizing the relay 183, while switch 182 is opened so that only the holding circuit through switch 177 maintains energization of the said electromagnet. Operation of the circuit thereafter is the same as in motion of the reverse gear from neutral to reverse engaged position.

Conversely, the reverse gear may be similarly operated from reverse engaged position to forward engaged position, electromagnet 172 controlling the motor switches. When the control lever 18 is operated so as to move the reverse gear to an engaged position either from the opposite engaged or neutral position, by completing the control circuit at the left or right hand pair of contacts 32, the corresponding initiating switch 180 or 182 is closed thereby since limit switch 163 or 160 is initially closed, and energizes the electromagnet 172 or 174 to close one of the motor circuits, and the signal lamp circuit. If the reverse gear should offer excessive resistance to operation due to a mechanical defect, before the operating shaft 104 has moved sufficiently to open the limit switch 163 or 160, the overload torque applied by the motor will open overload switches 158 and 159. This deenergizes the electromagnet 172 or 174 and interrupts the motor circuit and signal lamp circuit. But when the spring 141 resets the overload switches, the electromagnet is reenergized restarting the motor and reenergizing the signal lamp and the operation is repeated. The resulting intermittent flashing of the signal lamp apprises the operator that the device has failed to operate due to excessive mechanical resistance, while at the same time the motor is protected from stalling across the line or applying excessive operating torque to the mechanism.

If it is desired to operate the reverse gear by auxiliary means instead of by means of the actuating mechanism, for instance, if it becomes necessary to operate the reverse gear by hand because of a low battery or faulty electrical system, both control stations may be rendered inoperative to control the reverse gear by opening the master switches 55. However, the control lever of one station or the other, depending upon the setting of switch-over device S, remains operative to control the throttle. Opening of the master switches disconnects all of the control circuits from the battery or other source of power, including the circuits of the latch solenoids 40 and 41 so that the control levers 18 may be moved freely over their entire range to operate the engine throttle.

If it is desired to operate the system from the right-hand control station C, the switch-over or selector device S is adjusted to close microswitches 85a, b, c, d and e and to open microswitches 84a, b, c, d and e. Switches 84a and 85a control the circuits from the positive terminal of the battery to the respective master switches 55 of the left and right hand control stations; switches 84b and 85b, the holding and initiating circuits of the motor switch from the negative battery terminal to said master switches; switches 84c and 85c, the circuits from the negative terminal of the battery through the respective signal lamps 54 to said master switches; switches 84d and 85d, the circuit from the negative terminal of the battery through the respective "astern" latch solenoids 40 to said master switches and switches 84e and 85e, the corresponding circuits through the respective "forward" latch solenoids 41.

Thus all of the control circuits of the left-hand control station are rendered inoperative, and those of the right-hand station are rendered operative by the said operation of the microswitches.

Often in marine installations, twin or multiple engines and propellers are used. Separate controls for the various engines are provided, similar operation thereof being normally used for operation of the vessel in forward or rearward direction, and differential operation being employed advantageously for maneuvering the vessel.

Figure 12:
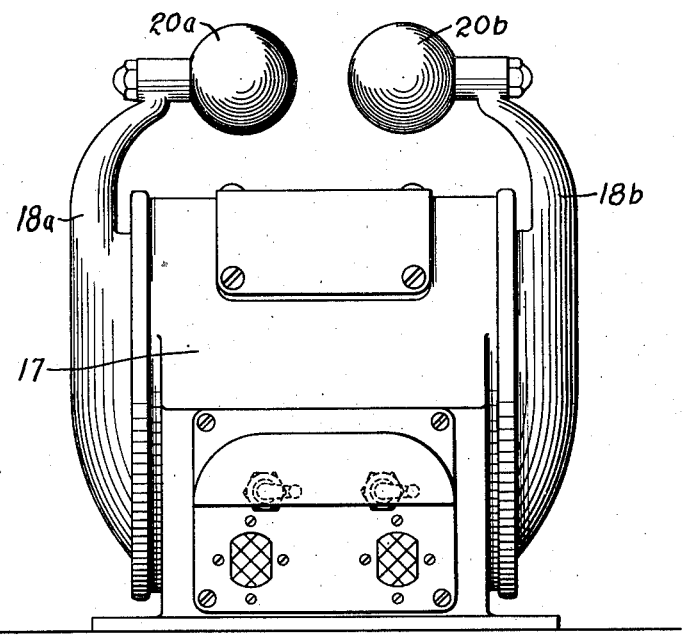
Fig. 12 is a front elevational view of a control station for operating the reverse gears and throttles of two separate engines.

In marine installations having twin engines and propellers, two separate control systems as above described are provided therefor respectively. According to the present invention, however, in each control station, the control levers for the respective control systems are mounted so that they may be operated by one hand either for similar or differential control of the throttle and reverse gear, and this is accomplished by mounting the grip handles to move in adjacent nonintersecting paths. For instance, as illustrated in Fig. 12, levers 18a and 18b controlling separate systems are coaxially mounted on opposite sides of the same casing 17, with the grip handles 20a and 20b projecting inwardly above the casing so that they move in adjacent parallel arcuate paths. The two levers are so arranged that conjugate motion of the two grip handles effects similar control of the respective systems.

By this arrangement, both handles may be gripped by one hand and moved forward or backward in conjugate relation to effect similar controls of the two engine throttles and reverse gears, while the other hand of the operator remains free, for instance, to operate the steering mechanism.

By twisting the hand, the two levers may be moved differentially, when both reverse gears are similarly engaged, for accelerating one engine more than the other to maneuver the vessel.

When both levers are in neutral position, they may be grasped with one hand, and by a twisting motion may be moved to opposite reverse gear engaging positions to drive the respective propellers in opposite directions for maneuvering the vessel. The latches 34 and 35 which limit motion of the respective levers until the reverse gears are engaged facilitate positioning of the levers for this operation. Conversely, the levers may be moved back again from their opposite positions to neutral position by one hand, the yieldable detent comprising roller 27 and segment 24 facilitating the positioning of the levers in neutral.

Figure 13:
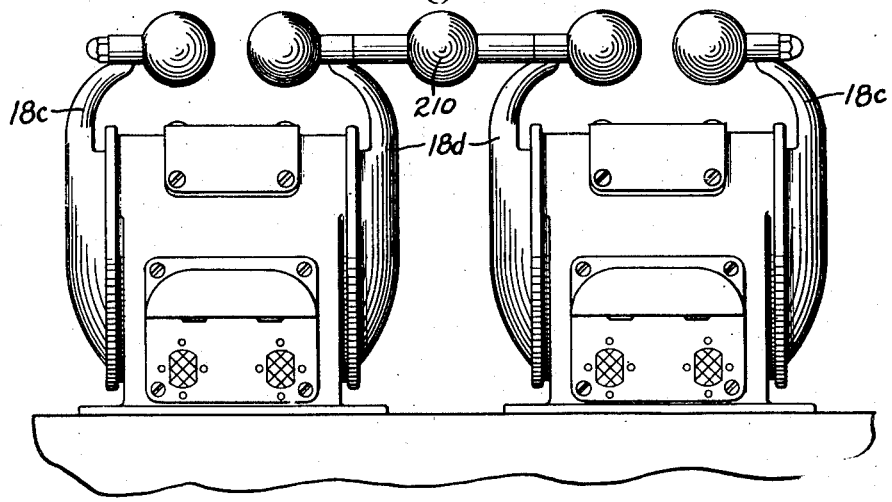
Fig. 13 is a front elevational view of a control station arrangement for operating the reverse gears and throttles of three separate engines.

In installations having three engines, two dual control stations as illustrated in Fig. 12 may be mounted side by side as shown in Fig. 13. The outer control levers 18c operate the port and starboard engines respectively, while one of the inner or adjacent levers 18d is adapted to operate the central engine. The other inner lever is inoperative. The two inner levers 18d are joined by means of a rigid transverse bar 218. With this arrangement, the three control systems may be readily operated by one hand or by the forearm to move all of the levers conjugately along their respective paths for effecting similar control of each of the engines. Differential control of the middle engine and either of the side engines may be effected by one hand in a manner similar to that described for twin engines.

Variations and modifications may be made within the scope of this invention and portions of the improvements may be used without others.

I claim:

1. In a control system for an internal combustion engine having a throttle adjustable between idling and full speed settings, and a clutch for coupling the engine to a driven member; electric clutch-operating means; a single manually operated controller for controlling the throttle and clutch-operating means, mechanical means operated by the controller for setting the throttle for clutch-shifting speed; and electrical means operated by the controller for causing said clutch-operating means to automatically disengage the clutch after the throttle is set to substantially clutch-shifting speed, and for causing said clutch-operating means to automatically engage the clutch before mechanically advancing the throttle from clutch-shifting setting.

2. In a control system for a prime mover having a controllable power supply and a clutch for coupling the prime mover to a driven member, automatic means for engaging the clutch; a single manually operated controller for controlling said power supply and said clutch-engaging means; means operated by the controller for initiating operation of said clutch-engaging means to couple the prime mover to the driven member at a predetermined power supply adjustment; electromagnetic latch means normally preventing operation of said controller to increase said power supply beyond said predetermined adjustment; and limit switch means controlled by said clutch-engaging means for releasing said latch when said clutch is engaged.

3. In a control system for a prime mover having a controllable power supply and a clutch for coupling the prime mover to a driven member, automatic operating means for engaging and disengaging the clutch; a single manually operated controller for controlling said power supply and said clutch-operating means; means operated by the controller for initiating operations of the clutch-operating means to couple and uncouple the prime mover and the driven member upon movement of the controller to alternate positions respectively at which the power supply is relatively reduced; electromagnetic latch means normally preventing operation of said controller to increase the power supply substantially beyond said reduced adjustment; and limit switch means controlled by said clutch-operating means for releasing and resetting said latch means during said coupling and uncoupling operations respectively.

4. In a control system for a prime mover having means for controlling the power supply, and clutch means for coupling and uncoupling the prime mover from a driven member, a plurality of remote control stations for said power supply and clutch; a switch-over station separate from said control station comprising means for selectively rendering said control stations operative one at a time, said means effecting by a single operation transfer of the control of both clutch and power supply from one control station to another, whereby simultaneous operation of clutch and power supply respectively from separate control stations is prevented.

5. In a control system for a prime mover having a controllable power supply and a clutch for coupling the prime mover to a driven member; an electric motor for operating the clutch; a single manually operated controller for controlling the power supply and initiating the operation of the electric motor to operate the clutch to couple the prime mover to the driven member at a predetermined power supply adjustment; and an electric signal adjacent the controller and connected in the electric motor circuit, said signal becoming operative upon movement of the controller to the position to initiate operation of said electric motor and inoperative upon the motor completing the coupling operation and indicating to the user upon becoming inoperative that the controller may be moved beyond the predetermined power supply adjustment.

6. In a control mechanism of the type described, a reversibly operable rotary driving member; a coaxial rotary member to be driven thereby, movable between arcuately spaced limiting positions; drive means interlocking the two members, comprising a spider keyed to one member; a jack shaft mounted eccentrically on the spider; a pair of mutually coupled planetary gears on said jack shaft; a gear keyed coaxially to the other rotary member engaging one of said planetary gears; a second coaxial gear mounted for independent rotation about its axis and engaging the other planetary gear; means limiting the rotation of said independent gear to an angle at least as great as the angular displacement of the spider corresponding to an arcuate displacement of the driven member from one limiting position to the other, said means cooperating with the independent gear to provide a lost-motion coupling between said rotary members permitting operation of said driven member by external means without moving said driving member.

7. In a control mechanism of the type described, a housing; a reversibly operable rotary driving member; a rotary member to be driven thereby movable between arcuately spaced limiting positions, said rotary members being coaxially journaled in the housing; drive means interlocking the two members, comprising a spider keyed to the driven member; a jack shaft mounted eccentrically on the spider; a pair of mutually coupled planetary gears on said jack shaft; a gear keyed coaxially to the rotary driving member engaging one of said planetary gears; a ring gear mounted for independent rotation about the axis of said rotary members and engaging the other planetary gear; stop means on said housing, and cooperating stop means on the periphery of said ring gear limiting the rotation of the latter relative to said housing to an angle at least as great as the angular displacement of said driven member from one of its limiting positions to the other, said means cooperating with the independent ring gear to provide a lost-motion coupling between said rotary members permitting operation of said driven member by external means without moving said driving member.

8. An overload responsive device comprising a mechanism for moving a controlled member from one limiting position to another through an intermediate neutral position; yieldable detent means for arresting motion of said member under its own momentum in neutral position; an electric motor for driving said mechanism; normally open switch means controlling the motor circuit; a pair of electromagnetic means for closing said motor switch upon energization of either electromagnetic means; an energizing circuit for one of said electromagnetic means, said circuit including a manual control switch and an initially closed limit switch, the former initiating motor operation to move said control member from a limiting position toward neutral position, and the latter actuated by said mechanism to open said circuit during said motion, said detent means thereafter arresting said member in neutral position; an energizing circuit for the other electromagnetic means, including an overload responsive switch for temporarily opening said circuit in response to continued rotation of said motor after motion of said controlled member is arrested by reaching the second limiting position; a holding switch in said circuit controlled by either electromagnetic means to maintain the circuit through the latter electromagnetic means, once it is established, and an initially open limit switch closed by said mechanism before the controlled member reaches neutral position from the initial limiting position; a starter circuit shunting said holding switch and the latter limit switch, comprising an initially closed automatic switch and a momentary manual control switch, the latter being alternately operable with reference to the aforementioned manual control switch, and the former being opened by continued operation of said mechanism after closure of the last-named limit switch, said first-named limit switch and the circuit of the first electromagnetic means being opened by said mechanism before closure of the last-named limit switch in the circuit of the second electromagnetic means to avoid consecutive energization of the two electromagnetic means in response to closure of the first-named manual control switch.

9. An overload responsive device comprising a mechanism for moving a control member between two limiting positions through an intermediate neutral position; an electric motor for driving said mechanism; a normally open reversing switch means having alternate circuit-closing positions for operating the motor in alternate directions; a pair of electromagnetic means closing said reversing switch respectively for motor operation in alternate directions; a pair of circuits for energizing said electromagnetic means, including normally closed over load responsive switch means controlled by said mechanism for opening the circuits upon continued rotation of the motor after said controlled member reaches either limiting position, and a holding switch in each circuit held closed by energization of the respective electromagnetic means for maintaining energization thereof; a pair of starter circuits respectively shunting said holding switches, each including a relay switch and a momentary manual control switch, the latter being alternately operable; a pair of relay circuits for closing said relay switches respectively upon energization; and a pair of normally closed limit switches alternately opened by said mechanism during motion of said controlled member toward its respective limiting positions from neutral position to open the relay switch in the starter circuit of the last-operated manual control switch.

10. In a control system for a prime mover having a controllable power supply and a clutch for coupling the prime mover to a driven member; an electric motor for engaging and disengaging the clutch; a single manually operated controller; and means operated by the controller to first control the power supply to, and direction of operation of, the electric motor to cause the clutch to engage the controlling member and then mechanically controlling the power supply for the prime mover within maximum limits when the controller is moved from idle toward operating position.

11. In a control system for a prime mover having a controllable power supply and a clutch for coupling the prime mover to a driven member; an electric motor for engaging and disengaging the clutch; a single manually operated controller; and means operated by the controller to first mechanically control the power supply for the prime mover to reduce the speed of the same to a predetermined minimum and then control the power supply to, and direction of operation of, the electric motor to cause the clutch to disengage the driven member when the controller is moved from operating to idle position.

12. A remote control clutch operating device; a clutch operator including power means for shifting the clutch from disengaged to engaged positions; a control station remote from the clutch operator including a manually operable controller and means operated thereby for initiating operation of said power means; and a signal at said control station and connected to said power means to be made operative by operation of said controller and inoperatvie by the completion of the operation of said power means for indicating to the operator that the clutch is being shifted.

13. A remote control clutch operating device; a clutch operator including power means for shifting the clutch from disengaged to engaged positions; a control station remote from the clutch operator including a manually operable controller and means operated thereby for initiating operation of said power means when the controller is moved from idling position; and a signal at the control station made operative by movement of the controller from idling position and inoperative incidental to the completion of the movement of the clutch to engaging position for indicating to the operator that the clutch is being shifted.

14. A remote control clutch operating device; a clutch operator including power means for shifting the clutch from disengaged to engaged positions; a control station remote from the clutch operator including a manually operable controller and means operated thereby for initiating operation of said power means; a signal at said control station made operative by operation of said controller and inoperative by the completion of the operation of said power means for indicating to the operator that the clutch is being shifted; throttle advancing means operated by the controller after it is moved beyond clutch-operating position; and means resisting movement of the controller beyond the position at which the clutch-engaging operation is initiated until the clutch is in its operating position.

15. In a marine installation, a port engine and a starboard engine, each engine having a reverse gear, shifting means therefor, and individual throttle control, a bridge control station and a pilot house control station, each having two levers, one for each of said engines, and each lever being adapted to control the shifting means for the reverse gears both for forward and reverse operation and the opening and closing of the throttle for one of the engines; and change-over means including means individual to each engine for connecting one or the other of the control stations to the reverse gear operating means and throttle of said engine.

16. In a control system for a power supply having a power supply means; a plurality of separate control stations; a plurality of push rods operated from the control stations; a push rod leading to and connected with the power supply means to control the same; and a switch-over station for connecting either of the control station rods to the push rod for the power supply means comprising pivoted arms directly connected respectively to said rods and a coupling member rotatable with the arm connected to the push rod for the power supply means and shiftable to connect with and be moved by either of the arms connected to the control stations, whereby operation of the selected connected control station rod controls the power supply means.

17. In a control system for a power supply comprising a power supply means; a plurality of control stations; a control handle at each station; a plurality of Bowden wires respectively operated from the handles of said control stations; a selector device comprising a shaft, a plurality of arms rotatably mounted on the shaft and respectively connected to said Bowden wires; an operating arm fixed on the shaft; a Bowden wire connected at one end to said last-named arm and at the other end to said power supply means for effecting a control thereof; and an adjustable clutch for selectively connecting one of said rotatable arms to said shaft and fixed arm whereby operation of the selected handle at the control station controls the operation of the power supply.

18. In a control system for a power supply having a power supply means and a plurality of separate control stations; a plurality of push rods operated from the control stations; a push rod leading to a common operating station and connected to the power supply means; a switch-over station for connecting either of said control station rods to the operating station rod comprising pivoted arms directly connected respectively to said rods and a coupling member rotatable with the arm connected to the operating station rod and shiftable to connect with and be moved by either of the arms connected to the control station rods to control the power supply means therefrom; and guide means for said push rods controlling the angular movements of the ends of the rods connected to the pivoted arms.

19. In a control system having a power station and a plurality of separate control stations; power supply means at the power station; a power control handle at each control station; a plurality of Bowden wires respectively connected to the control handles of the control stations for operation thereby; a Bowden wire connected to the power supply means; a selector device comprising a plurality of pivotally mounted members operatively connected to the Bowden wires connected to the control handles and to the Bowden wire for the power supply means; and an adjustable clutch means for selectively coupling the pivotally mounted member connected to the power supply means with one of said pivotally mounted members connected with a handle at a control station whereby movement of the selected control handle effects a control of the power supply means.

20. In a selective device for selectively controlling a power supply, a power supply means; a pair of power control handles; a pair of control levers operated by said handles and mounted for independent pivotal movement about a common axis; coupling means on said levers; an intermediate coaxial clutch member adapted to engage said coupling means; a coaxially mounted operating lever secured to said clutch member for pivotal motion therewith; selector means for selectively engaging said clutch with either of said coupling means; a pair of control links pivotally connecting said control levers to the handles; and an operator link connected to the power supply means and pivotally joined to said operating lever, said links being joined to the levers at points equidistant from the axis, whereby motion of the handle, when the clutch is engaged with the corresponding control lever produces an equal motion at the power supply means through the operator links; said selector means including mechanical clutch shifting means remote from both handles for shifting said clutch to engage one or the other of the coupling means on the control levers.

21. In a control system for a power supply having a power supply means; a plurality of separate control stations; a plurality of push rods operated from the control stations; a push rod leading to a common operating station and connected to the power supply means; a switch-over station for connecting either of the control station rods to the operating station rod comprising pivoted arms directly connected respectively to the rods and a coupling member rotatable with the arm connected to the operating station rod and shiftable to connect with and be moved by either of the arms connected to the control station rods to transmit movement of the selected control station push rod to control the power supply means; and guide means for said push rods for slidably mounting the latter for linear movement, said guide means being pivotally mounted to permit angular movements of said rods incident to the pivotal movement of the arms to which they are connected.

ERWIN J. PANISH.

REFERENCES CITED

The following references are of record in the file of this patent:

UNITED STATES PATENTS

| Number | Name | Date |
|---|---|---|
| 994,021 | McElroy | May 30, 1911 |
| 1,223,316 | Curtiss | Apr. 17, 1917 |
| 1,667,842 | Coykendall | May 1, 1928 |
| 1,682,358 | Sperry | Aug. 28, 1928 |
| 1,747,594 | Panish | Feb. 18, 1930 |

(Other references on following page)

UNITED STATES PATENTS

| Number | Name | Date |
|---|---|---|
| 1,858,999 | McCollum | May 17, 1932 |
| 1,886,518 | Beckwith | Oct. 8, 1932 |
| 1,889,295 | Rosatelli | Nov. 29, 1932 |
| 1,911,599 | Bloxsom | May 30, 1933 |
| 2,003,351 | Eells | June 4, 1935 |
| 2,187,831 | Lange | Jan. 23, 1940 |
| 2,206,771 | Dugas | July 2, 1940 |
| 2,214,009 | Claytor | Sept. 10, 1940 |
| 2,231,858 | Domina | Feb. 11, 1941 |
| 2,234,019 | Bragg | Mar. 4, 1941 |
| 2,235,943 | Mylius | Mar. 25, 1941 |
| 2,243,321 | Smith | May 27, 1941 |
| 2,254,144 | Higgins | Aug. 26, 1941 |

FOREIGN PATENTS

| Number | Country | Date |
|---|---|---|
| 429,213 | Great Britain | Feb. 22, 1935 |
| 838,732 | France | Mar. 14, 1939 |